United States Patent
Dokovski et al.

(10) Patent No.: US 8,527,992 B2
(45) Date of Patent: Sep. 3, 2013

(54) HTTP REQUEST PRESERVATION

(75) Inventors: Nikolai Dokovski, Sofia (BG); Diyan Yordanov, Varna (BG)

(73) Assignee: SAP AG, Walldorf (DE)

( * ) Notice: Subject to any disclaimer, the term of this patent is extended or adjusted under 35 U.S.C. 154(b) by 493 days.

(21) Appl. No.: 12/570,203

(22) Filed: Sep. 30, 2009

(65) Prior Publication Data
US 2011/0078703 A1 Mar. 31, 2011

(51) Int. Cl.
*G06F 9/46* (2006.01)

(52) U.S. Cl.
USPC ............ 718/100; 718/106; 709/201; 709/219

(58) Field of Classification Search
USPC .......................... 718/100, 106; 709/201, 219
See application file for complete search history.

(56) References Cited

U.S. PATENT DOCUMENTS

| | | | |
|---|---|---|---|
| 6,233,622 B1 * | 5/2001 | Atsatt et al. ................... | 719/315 |
| 7,130,877 B2 * | 10/2006 | McNeely et al. ............. | 709/201 |
| 7,490,347 B1 | 2/2009 | Schneider et al. | |
| 7,752,258 B2 * | 7/2010 | Lewin et al. .................. | 709/203 |
| 7,805,675 B2 * | 9/2010 | Cradick et al. ................ | 715/704 |
| 7,873,719 B2 * | 1/2011 | Bishop et al. ................. | 709/223 |
| 2001/0011304 A1 * | 8/2001 | Wesinger et al. ............. | 709/227 |
| 2006/0047755 A1 * | 3/2006 | Jurova .......................... | 709/206 |
| 2008/0163267 A1 | 7/2008 | Jurova et al. | |
| 2008/0270992 A1 | 10/2008 | Georgieva et al. | |

* cited by examiner

*Primary Examiner* — Andy Ho
(74) *Attorney, Agent, or Firm* — Fish & Richardson P.C.

(57) ABSTRACT

The present disclosure involves systems, software, and computer implemented methods for preserving a Hypertext Transfer Protocol (HTTP) request. One process includes operations for receiving an HTTP request and generating request and response objects representing the HTTP request. Multiple child threads are generated and then executed at content providers to render content in response to the HTTP request. A first portion of the rendered content is transmitted, but the request and response objects are stored in memory and made accessible to content providers associated with pending child threads. The content providers associated with the pending child threads utilize the request and response objects to render a second portion of the content.

21 Claims, 3 Drawing Sheets

HTTP REQUEST PRESERVATION

TECHNICAL FIELD

The present disclosure relates to software, computer systems and computer implemented methods for preserving Hypertext Transfer Protocol (HTTP) requests.

BACKGROUND

One mechanism for Web applications to utilize asynchronous web request processing is a back-end application forking new child threads from a parent request thread originating from a Hypertext Transfer Protocol (HTTP) request. The new child threads are generated in parallel to render content from multiple content providers responsive to the initial HTTP request. The child threads may access data objects associated with the initial HTTP request in order to render the appropriate content in response to the HTTP request. Some child threads, however, may require longer processing times. In such instances, the data objects associated with the HTTP request may be released or recycled after termination of the parent request thread but before all the child threads have finished generating content. Once the data objects are released or recycled, the child threads are unable to access the data objects.

SUMMARY

The present disclosure provides systems, software, and computer implemented techniques for preserving a Hypertext Transfer Protocol (HTTP) request such that an initial response to the HTTP request can be delivered while pending child threads associated with the HTTP request are still rendering additional content in response to the HTTP request. For example, a computer program product is encoded on a tangible storage medium, where the product comprises computer readable instructions for causing one or more processors to perform operations. These operations can include receiving an HTTP request and generating request and response objects representing the HTTP request. Multiple child threads are generated and then executed at content providers to render content in response to the HTTP request. A first portion of the rendered content is transmitted to a user in an HTTP response, but the request and response objects are stored in memory and made accessible to content providers associated with pending child threads. The content providers associated with the pending child threads utilize the request and response objects to render a second portion of the content.

Various implementations can include the following features. For example, the techniques can also include defining a timeout period, wherein the request and response objects are released from memory after expiration of the timeout period. The request and response objects can also be released after all pending child threads have been terminated. Further, the second portion of the content generated in response to the HTTP request is stored in memory or delivered to a user in a second HTTP response.

While generally described as computer implemented software embodied on tangible media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
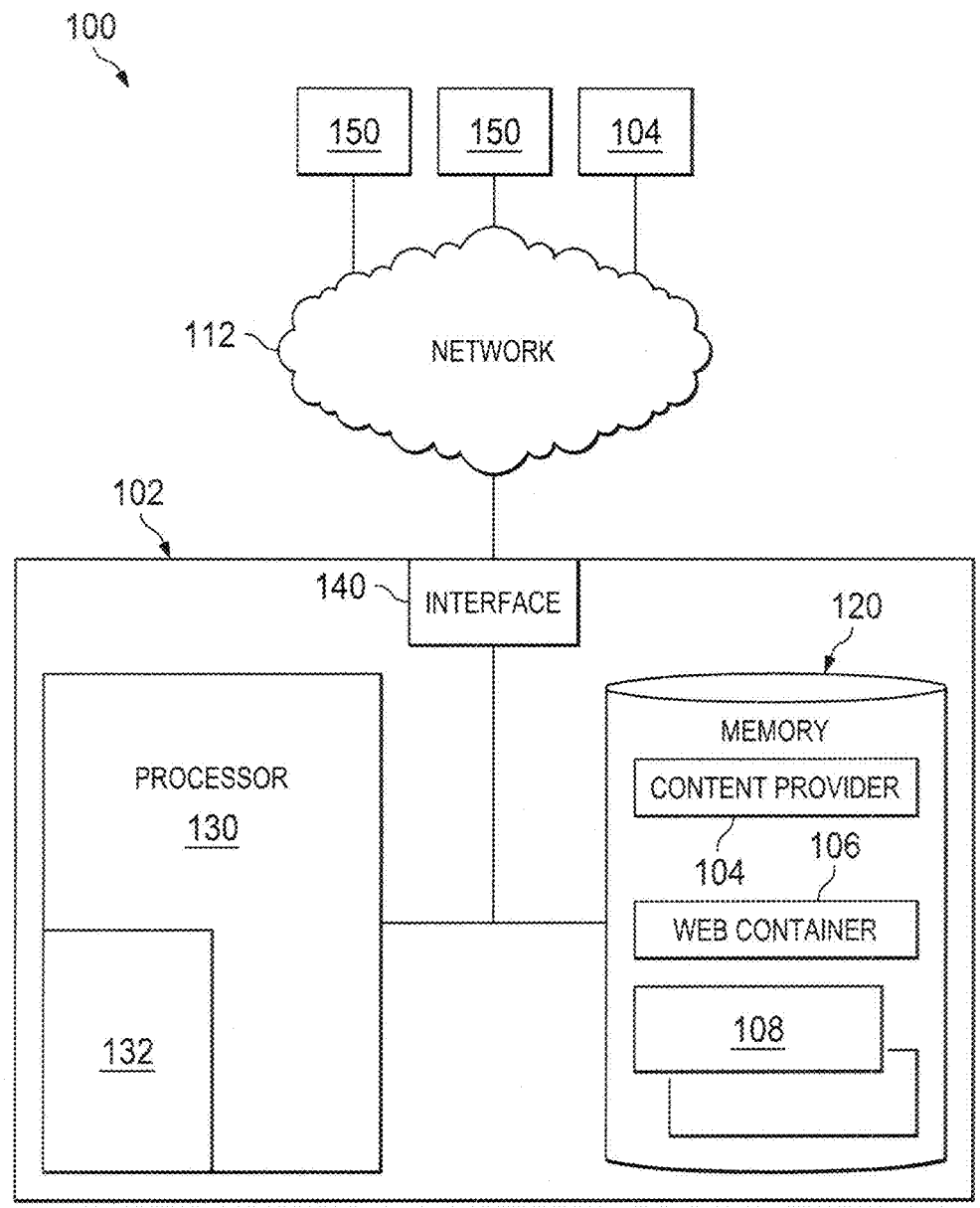
FIG. 1 illustrates an example environment implementing various features of preserving an HTTP request within the context of the present disclosure.

This disclosure generally describes computer systems, software, and computer implemented methods for preserving a Hypertext Transfer Protocol (HTTP) request at a web container for asynchronous request processing. In certain implementations, preserving an HTTP request comprises extending the lifetime of request and response objects in order to make them available for any pending child threads that have not been completely executed yet. Request and response objects are data objects representing an initial HTTP request received at a web container, and the initial HTTP request is the main request thread that is processed for returning an HTTP response to the requesting client. For example, after receiving an HTTP request, a web container may generate request and response objects associated with the HTTP request and invoke an appropriate application to execute the request. The application in turn forks the main request thread into multiple child threads for rendering content from various content providers in parallel. The child threads utilize the request and response objects at the content providers for rendering content, and some child threads may be completed before other child threads. As the child threads are being executed at the various content providers, the web container can generate and transmit an HTTP response to the requesting client comprising a portion of the responsive content already generated by the content providers. In order to present at least a portion of the responsive content to the client while the remaining content is being processed, the HTTP response can be transmitted to the client even if there are pending child threads in the process of rendering content. Here, the web container maintains the request and response objects even after transmitting the HTTP response to the client so that pending child threads can continue to access the request and response objects until completion. Thus, the request and response objects associated with the main request thread are preserved even after the web container releases an initial HTTP request thread and corresponding response to the client. After the pending child threads are completed, the request and response objects may be discharged. Alternatively, in some implementations, request and response objects may be automatically discharged after a predefined amount of time.

One potential benefit of such techniques is that the client is presented with a portion or particular views of the content responsive to an HTTP request before the entirety of the content has been rendered. For instance, web containers commonly recycle request and response objects once the main HTTP request thread terminates, thereby breaking a forked asynchronous request thread whenever a response to an HTTP request is transmitted to a client application. In other words, the main request thread may leave the web container before completion of the child threads, effectively releasing the request and response objects. Once the objects are released, they cannot be utilized by the remaining child threads. By preserving the request and response objects by the web container, content providers can proceed to generate an HTTP response even after the release of the main request thread by permitting any unfinished child threads to continue using data objects associated initially with the main request thread. Accordingly, the client application may be updated with the most recently generated content while the web container preserves the initial HTTP request until all responsive content has been generated, thereby allowing at least a first portion of the responsive content to be presented to a user before all the content has been rendered.

Further, the methods described in the present disclosure can be used to develop asynchronous views of requested content, enabling users of a web application to process views which load on a different cycle from the response-request cycle of a regular web application user interface. Other benefits from the perspective of the web application's user interface technology implementing the preservation mechanism of the present disclosure include the rendering of content for display even when the processing is unfinished, rendering the content that is available and using a placeholder for the remaining content, processing the additional content asynchronously, enabling the application to provide feedback concerning the processing state, and implementing the preservation mechanism using server-side logic as opposed to client-side logic.

Turning to the illustrated example, FIG. 1 illustrates an example system 100 for preserving an HTTP request at a web container for asynchronous request processing. System 100 is typically a distributed client/server system that spans one or more networks such as 112 and includes a computer 102. Computer 102 can include some computer device such as a server (hereinafter referred to as server 102). Server 102 comprises an electronic computing device operable to receive, transmit, process and store data associated with system 100. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, touch screen terminal, network computer, kiosk, wireless data port, smart phone, personal data assistant (PDA), one or more processors within these or other devices, or any other suitable device. In other words, the present disclosure contemplates computers other than general purpose computers as well as computers without conventional operating systems. Server 102 may be adapted to execute any operating system including Windows, Linux, UNIX, Windows Server, or any other suitable operating system. According to one embodiment, server 102 may also include or be communicably coupled with a web server that allows users to access various web or network functionality and/or a mail server.

In some implementations, server 102 has access to one or more content providers 104 over a network. Alternatively, server 102 can include a content provider 104 stored and accessed locally with respect to the server 102. Content providers 104 can be components of an application 132 that utilize request and response objects 108 associated with a client request to render and deliver content in response to the client request. Application 132 can include a web development or enterprise application, or any other application that implements asynchronous request processing and web application user interface technology. System 100 may represent a hosted solution that is developed or implemented by a first entity, while some or all of the content are developed by a second entity. Moreover, the processes or activities of the hosted solution may be distributed amongst these entities and their respective components. In such embodiments, data may be communicated or stored in an encrypted format such as, for example, using the TNG encryption algorithm. This encrypted communication may be between the user and the host or amongst various components of the host. But system 100 may be in a dedicated enterprise environment—across a local area network or subnet—or any other suitable environment without departing from the scope of this disclosure.

Illustrated server 102 includes example processor 130. Although FIG. 1 illustrates a single processor 130 in server 102, two or more processors may be used according to particular needs, desires, or particular embodiments of system 100. Each processor 130 may be a central processing unit (CPU), a blade, an application specific integrated circuit (ASIC), or a field-programmable gate array (FPGA). The processor 130 may execute instructions and manipulate data to perform the operations of system 100, often using software. For example, processor 130 may execute some or all of an application 132, which is often a web application. The application 132 may be operable to exchange data with a plurality of enterprise-based systems and, in the process, update or modify one or more content repositories. The various services performed may allow the application 132 to orchestrate one or more business processes in synchronization with other processes that directly or indirectly affect the information stored within one or more of the content repositories. For instance, the application 132 may drive business processes across different applications, systems, technologies, and organizations, thus driving end-to-end business processes across heterogeneous systems or sub-systems. Regardless of the particular implementation, "software" may include any computer-readable instructions embodied on tangible medium (such as memory 120) including executable code, firmware, wired or programmed hardware, or any combination thereof as appropriate such that it is stored on tangible medium and operable to be executed. Indeed, each software component may be fully or partially written or described in any appropriate computer language including C, C++, Java, Visual Basic, assembler, Perl, any suitable version of 4GL, as well as others. It will be understood that while the software illustrated in FIG. 1 is shown as individual modules that implement the various features and functionality through various objects, methods, or other processes, the software may instead include a number of sub-modules, third-party services, components, libraries, and such, as appropriate. Conversely, the features and functionality of various components can be combined as sub-components within a single logical component as appropriate.

The example server 102 may be communicably coupled with a network 112 that facilitates wireless or wireline communication between the server 102 and any other local or remote computer, such as clients 150. The network 112 may be all or a portion of an enterprise or secured network. In another example, the network 112 may be a virtual private network (VPN) merely between the server and the client across wireline or wireless link. Such an example wireless link may be via 802.11a, 802.11b, 802.11g, 802.11n, 802.20, WiMax, and many others. The network 112 may include one or more local area networks (LANs), radio access networks (RANs), metropolitan area networks (MANs), wide area networks (WANs), all or a portion of the global computer network known as the Internet, and/or any other communication platform or systems at one or more locations. The network 112, however, is not a required component of the present disclosure.

Server 102 may also include interface 140 for communicating with other computer systems over network 112 in a client-server or other distributed environment. In certain embodiments, server 102 receives requests for data access from local or remote senders through interface 140 for storage in memory 120 and/or processing by processor 130. Generally, interface 140 comprises logic encoded in software and/or hardware in a suitable combination and operable to communicate with network 112. More specifically, interface 140 may comprise software supporting one or more communications protocols associated with communications network 112 or hardware operable to communicate physical signals.

In general, the server 102 is a computer with memory 120 for storing data and program instructions. Illustrated memory 120 represents any memory and may take the form of volatile or non-volatile memory including, without limitation, magnetic media, optical media, random access memory (RAM), read-only memory (ROM), removable media, or any other suitable local or remote memory components. Illustrated memory 120 includes storage of a web container 106 of the present disclosure that is executed by processor 130. In certain implementations, the web container 106 is a runtime environment which provides standard common services for runtime components of web applications such as application 132 executed on server 102. The common services can include services related to security, concurrency, life cycle management, transaction, deployment, and other services. The web container 106 can be associated with the presentation layer of an application server that manages servlets, Java Server Pages (JSP) files, Business Server Pages (BSP), and other web-tier components. Specifically, the web container 106 can be an implementation of servlet container service within a particular platform of the application server. Further, memory 120 may also include any other appropriate data such as HTML files, data classes or object interfaces, unillustrated software applications or sub-systems, and so on.

Figure 2:
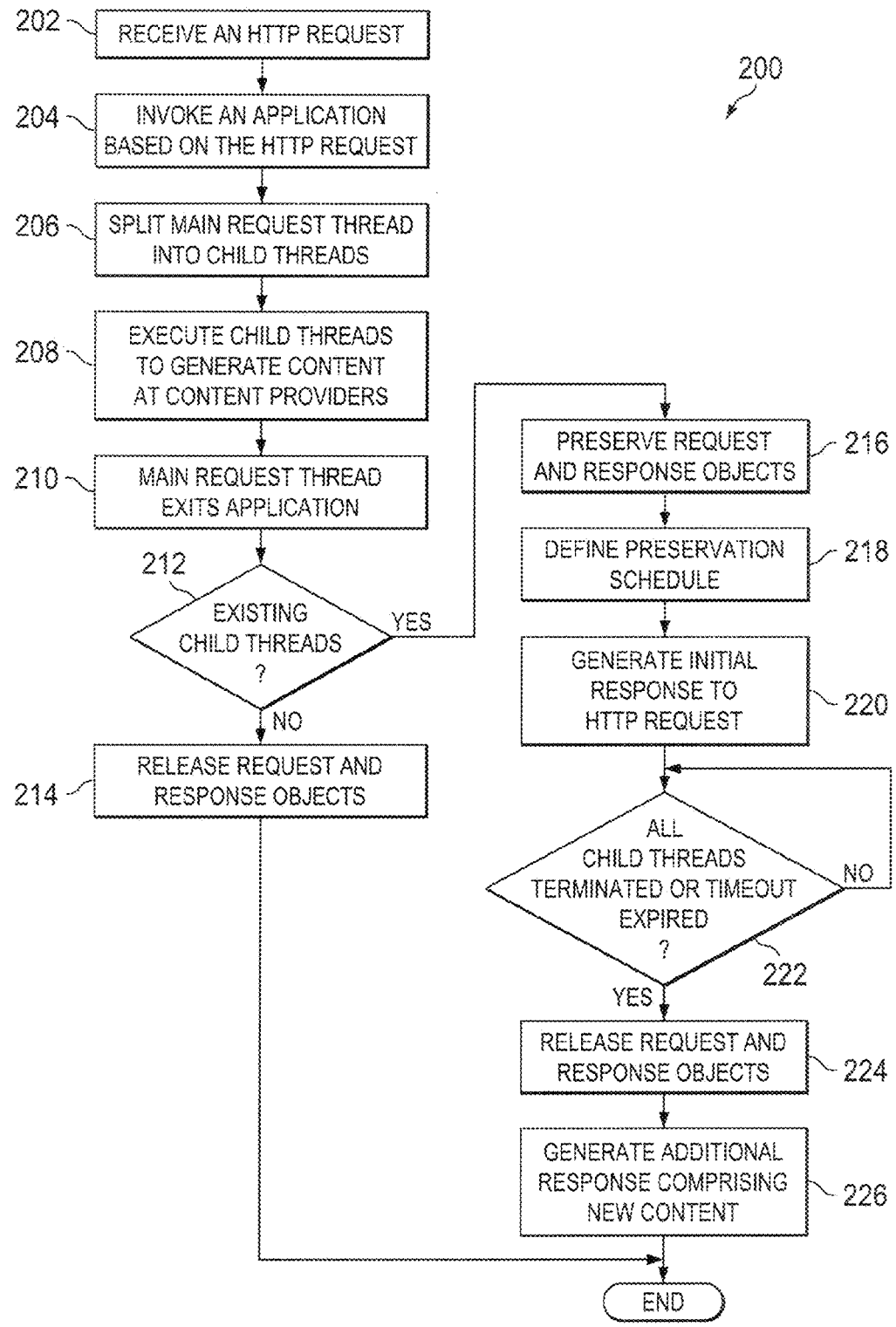
FIG. 2 is a flow chart depicting an example HTTP request preservation method implemented using an appropriate system, such as the system described in FIG. 1.

FIG. 2 is a flow chart depicting an example HTTP request preservation process of the present disclosure. First, a web container 106 receives an HTTP request from a client at 202. The web container 106 invokes one or more applications 132 based on the HTTP request in order to generate content in response to the request at 204. Here, the HTTP request is represented in the web container 106 as a main request thread, which is associated with particular request and response data objects 108. In certain implementations, the request and response data objects 108 are constructed by the web container 106 after receiving the HTTP request. Depending on the parameters of the HTTP request, the application 132 can split the main request or parent thread into multiple child threads for parallel processing at various content providers at 206, which use the request and response objects 108 associated with the main request thread to generate responsive content based on each distributed child thread at 208. In some instances, the application 132 completes execution of the main request thread while some child threads are still being processed at the content providers. For example, an HTTP request may contain a request for a web page comprising various components, and each component is associated with a particular child thread. Some components may require additional resources, resources that are processed at a back-end or remote system, or resources connected to a slower database or system. In certain complex environments, multiple content providers 104 may each provide a particular component of the web page, and some content providers 104 may generate responsive content immediately while other content providers 104 generate a temporary notification message and render content over a period of time. In other words, some child threads will be terminated sooner than others due to the nature of the components and the content providers associated with the requested web page. Nevertheless, the portions of the web page that are generated sooner may be returned to the client that originated the HTTP request for immediate feedback to a user at the client in the form of an HTTP response.

The main request thread exits the application after the application has finished processing the main request thread and generating child threads at the various content providers at 210. If there are no pending child threads after exiting the application at 212, the main request thread and associated request and response objects are released at 214; that is, the request and response objects are cleared from the web container because there are no further child threads remaining that would utilize those objects. If there are remaining child threads when the application is terminated, however, the web container enters a request prolongation phase. During request prolongation, the preservation mechanism of the present disclosure is invoked, and rather than destroy the request and response objects as is typically the case, the request and response objects are preserved for any child threads and associated content providers to access at 216. Preservation of request and response objects comprises storing the objects in a cache or memory for future use by content providers. The request and response objects can also be preserved by maintaining the current state of the objects. In some implementations, the preservation mechanism includes a method for the web container 106 to allow child threads to explicitly designate the particular request and response objects 108 for preservation.

In addition to preserving the request and response objects 108, a schedule for preservation is defined at 218. The schedule for preservation designates how long the request and response objects 108 are stored or what events trigger release of the objects 108. In certain implementations, the request and response objects 108 can be scheduled for release after a predefined timeout period has expired or when all pending child threads from the main request thread are completed. The predefined timeout period is a property indicating the length of time that the web container 106 maintains the request and response objects 108 after the response is returned to the client. The web container 106 may maintain an internal list of threads that still require use of the request and response objects 108, ensuring that the request and response objects 108 can be preserved as long as there are child threads still running. In other words, the request and response objects 108 are preserved for a time period that is aligned with the lifetime of the child threads executing the client request. When all child threads are terminated, and no timeout period has been defined, the request and response objects 108 are recycled and returned to a pool of request and response objects at the server 102. In one implementation, the web container preserves the request and response objects 108 until all child threads are terminated, and then recycles the objects, but supplies new objects rather than return old request and response objects to the pool. If a timeout period has been designated and expires while there are pending child threads, the web container 106 terminates references to the child threads but supplies new request and response objects into the pool without recycling the old request and response objects.

At this juncture, although the initial request and response objects 108 are preserved for any currently pending child threads, an initial HTTP response comprising completed content is generated at 220 for transmission to the client. The HTTP response can include aggregated content in response to the HTTP request as well as notification messages indicating the particular components of the requested web page that are still being processed by the content providers. In some implementations, this initial HTTP response may be returned to the client after the user has initiated an HTTP request for a different web page by navigating away from the web page of the initial HTTP request.

From the user's perspective, responsive content is returned immediately upon sending an HTTP request. Thus, the user at the client is notified that portions of the initial HTTP request are still being processed, but the user can receive some of the finished content even while the remaining content is being processed. In certain implementations, in addition to immediate delivery of the response to the user, the user is also given control over components of the generated content for further handling or processing at the client location. For example, an HTTP request from a user can include a request for multiple portal components of a web page to be viewed in parallel at the client. If one of the portal components requires a longer time to generate, the portal components that are rendered immediately are delivered to the client first so that the user at the client can access and use the readily available portal components, while also including notification that the remaining portal component is still being rendered. From here, the client is given control of the delivered portal components despite the unfinished portal component.

Finally, after a timeout defined in the preservation schedule has expired or when there are no pending child threads from the main request thread remaining at 222, the preserved request and response objects 108 associated with the main request thread are released at 224. If there are no child threads pending, the web container 106 releases the request and response objects 108 and returns them to a pool. If a timeout value has been designated and the timeout expires while there are still child threads running, the web container 106 removes its references to the request and response objects 108 and supplies new request and response objects into the pool without recycling old response and request objects. One or more HTTP responses can be generated containing the additional content and transmitted to the client automatically or when further requests are received from the client at 226. In some implementations, the client application may include a browser that implements Asynchronous Java XML Processing (Ajax) or other interaction model/mechanism for transferring the additional content from the server to the client. The content provider may authorize the client browser to automatically refresh any requests for content or provide a schedule to the client browser for sending further client requests for additional content. Alternatively, the newly generated content can be stored by the content providers 104 in a cache for later use. In some implementations, the content providers 104 determine how the additional content is buffered for delivery to the client on the next client request.

Figure 3:
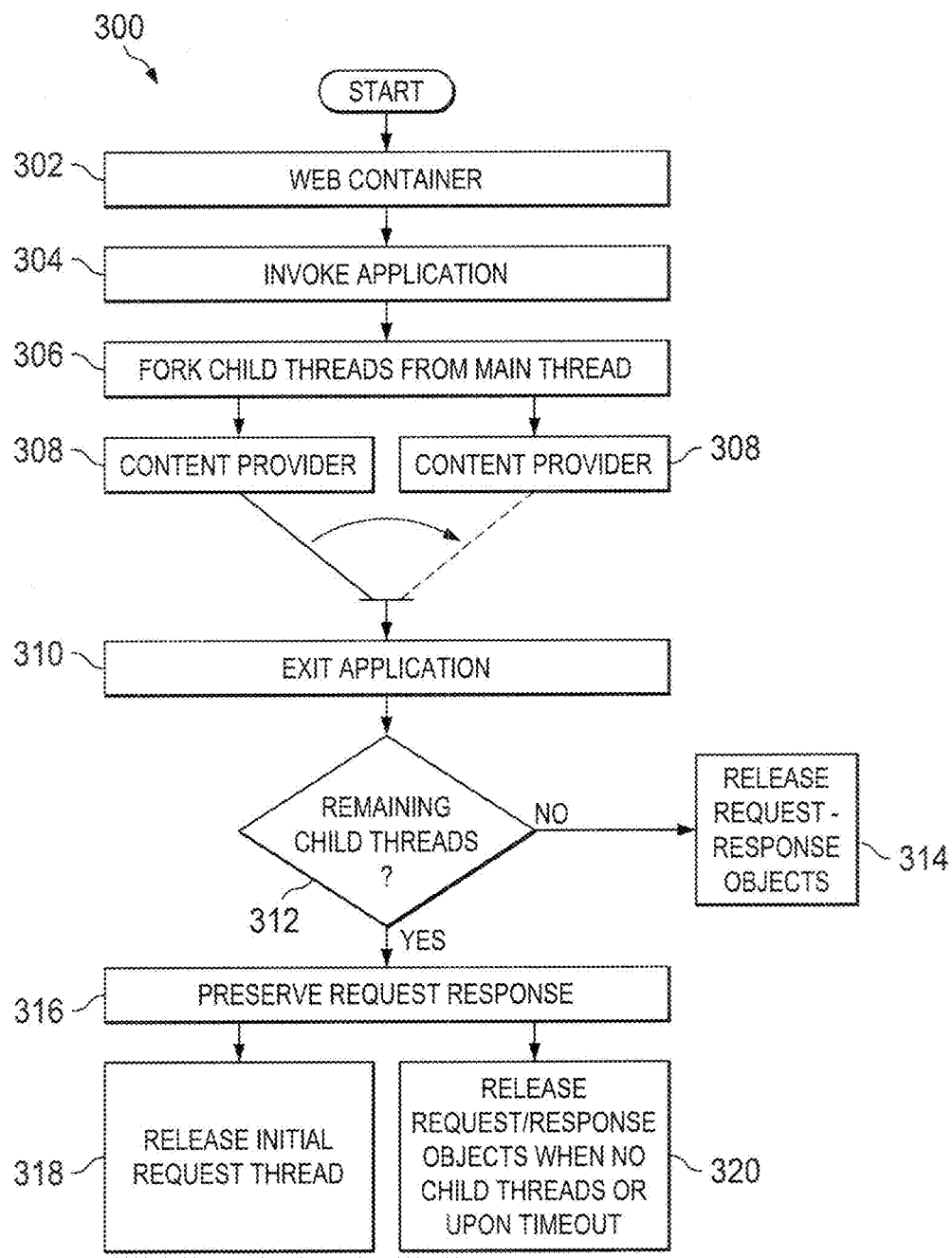
FIG. 3 is a flow diagram depicting the path of a request thread during the HTTP request preservation process implemented using an appropriate system, such as the system described in FIG. 1.

FIG. 3 is a flow diagram depicting the path of the request thread during the HTTP request preservation process. First, a client request enters the web container at 302. The web container preprocesses the request by constructing request and response objects representing the client request, which is handled by the main request thread that passes through the web container. The web container identifies an application to be invoked for processing the main request thread where the application can be any application that implements asynchronous request processing at 304. For sake of clarity, invocation includes requesting execution, confirm executing, or otherwise calling the application to perform the particular task. Consequently, the application forks new child threads from the main request thread and invokes various content providers to process the child threads in parallel at 306. The content providers utilize the request and response objects, initially constructed by the web container during preprocessing of the client request, in order to render content in response to each of the child threads at 308. The application then generates a response to the client based on the rendering results returned from the child threads. Some of the child threads may require a longer processing time than other child threads. In view of the preservation mechanism of the present disclosure, however, the application can generate a finished response even if there are child threads still being processed at the content providers.

Once the application has finished executing the request, the application terminates and the web container obtains control of the main request thread at 310. In some implementations, the application has already flushed and delivered the generated response to the client. Alternatively, the web container may flush and commit the response to the client if the application has not already done so. Thus, from the client's perspective, the client request has been processed completely, even though the actual request and response objects of the client request may be preserved at the web container for pending child threads. If there are no remaining child threads at 312, the request and response objects are released at 314. If there are remaining child threads at 312, the web container enters a request prolongation phase and marks the response as disabled, but preserves the client request at 316. The main request thread is suspended for a certain time period, and the web container continues to check for any child threads still being processed at the content providers. In some implementations, the initial request thread exits the web container here at 318. If there are no child threads or some predefined timeout value has expired, the web container releases the request and response objects as well as any remaining threads at 320. A response comprising any content rendered after the initial response was committed to the client can be generated and sent to the client upon receiving a further request from the client or through an automatic refresh mechanism. The additional content can also be stored in a cache by the content providers for future delivery to the client.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for causing one or more processors to preserve a Hypertext Transfer Protocol (HTTP) request, the method comprising the following steps performed by one or more processors:

generating request and response objects in response to a received HTTP request, the request and response objects used in association with execution of at least one child thread of a main request thread;

invoking an application based on the HTTP request;

generating a plurality of child threads during execution of the application for identifying content in response to the HTTP request, the plurality of child threads being associated with the main request thread and each of the plurality of child threads remaining active until completed;

executing the plurality of child threads at a plurality of different content providers;

transmitting at least one HTTP response that includes at least a first portion of content in response to the HTTP request, the first portion of content associated with at least one of the plurality of content providers;

preserving the request and response objects during execution of the plurality of child threads for access by at least one of the plurality of different content providers, wherein at least one of the plurality of child threads completes prior to the completion of the other child threads;

releasing the request and response objects after a termination event associated with the plurality of child threads occurs, wherein each of the plurality of child threads is completed prior to releasing the request and response objects; and after prior transmission of the at least one HTTP response including the at least a first portion of content in response to the HTTP request, transmitting additional content generated by the plurality of different content providers associated with the preserved request and response objects in the at least one additional HTTP response in response to the HTTP request.

2. The method of claim 1, wherein the termination event comprises termination of the plurality of child threads.

3. The method of claim 1, wherein the termination event comprises expiration of a predefined timeout period.

4. The method of claim 1 further comprising storing the additional content generated by the content provider in memory.

5. The method of claim 1 further comprising generating a preservation schedule defining parameters for preservation of the request and response objects.

6. The method of claim 1, wherein the HTTP response includes a notification of the additional content being generated by the content provider.

7. The method of claim 1, wherein the application is operable to perform asynchronous request processing.

8. The method of claim 1, wherein the request and response objects are associated with the main request thread, the main request thread released from memory after transmission of the HTTP response.

9. The method of claim 1, wherein the application terminates prior to the termination event.

10. The method of claim 1, wherein the request and response objects comprise at least one parameter of the HTTP request.

11. A computer program product encoded on a tangible storage medium, the product comprising computer readable instructions for causing one or more processors to perform operations comprising:

generating request and response objects in response to a received HTTP request, the request and response objects used in association with execution of at least one child thread of a main request thread;

invoking an application based on the HTTP request;

generating a plurality of child threads during execution of the application for identifying content in response to the HTTP request, the plurality of child threads being associated with the main request thread and each of the plurality of child threads remaining active until completed;

executing the plurality of child threads at a plurality of different content providers;

transmitting at least one HTTP response that includes at least a first portion of content in response to the HTTP request, the first portion of content associated with at least one of the plurality of content providers;

preserving the request and response objects during execution of the plurality of child threads for access by at least one of the plurality of different content providers, wherein at least one of the plurality of child threads completes prior to the completion of the other child threads;

releasing the request and response objects after a termination event associated with the plurality of child threads occurs, wherein each of the plurality of child threads is completed prior to releasing the request and response objects; and after prior transmission of the at least one HTTP response including the at least a first portion of content in response to the HTTP request, transmitting additional content generated by the plurality of different content providers associated with the preserved request and response objects in at least one additional HTTP response in response to the HTTP request.

12. The computer program product of claim 11, wherein the termination event comprises termination of the plurality of child threads.

13. The computer program product of claim 11, wherein the termination event comprises expiration of a predefined timeout period.

14. The computer program product of claim 11 further comprising storing the additional content generated by the content provider in memory.

15. The computer program product of claim 11 further comprising generating a preservation schedule defining parameters for preservation of the request and response objects.

16. The computer program product of claim 11, wherein the HTTP response includes a notification of the additional content being generated by the content provider.

17. The computer program product of claim 11, wherein the application is operable to perform asynchronous request processing.

18. The computer program product of claim 11, wherein the request and response objects are associated with the main request thread, the main request thread released from memory after transmission of the HTTP response.

19. The computer program product of claim 11, wherein the application terminates prior to the termination event.

20. The computer program product of claim 11, wherein the request and response objects comprise at least one parameter of the HTTP request.

21. The method of claim 1, further comprising defining a preservation schedule designating durations for storing the request and response objects and setting criteria for releasing the request and response objects.

* * * * *